US012525387B2

(12) United States Patent
Kim et al.

(10) Patent No.: US 12,525,387 B2
(45) Date of Patent: Jan. 13, 2026

(54) COIL COMPONENT

(71) Applicant: SAMSUNG ELECTRO-MECHANICS CO., LTD., Suwon-si (KR)

(72) Inventors: Young Ji Kim, Suwon-si (KR); Kwang Sun Choi, Suwon-si (KR); Jin Ho Ku, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 904 days.

(21) Appl. No.: 17/824,560

(22) Filed: May 25, 2022

(65) Prior Publication Data

US 2023/0230752 A1 Jul. 20, 2023

(30) Foreign Application Priority Data

Jan. 14, 2022 (KR) ........................ 10-2022-0005827

(51) Int. Cl.

*H01F 27/29* (2006.01)
*H01F 27/32* (2006.01)
*H01F 41/10* (2006.01)
*H01F 41/12* (2006.01)

(52) U.S. Cl.

CPC ......... *H01F 27/292* (2013.01); *H01F 27/323* (2013.01); *H01F 41/10* (2013.01); *H01F 41/122* (2013.01)

(58) Field of Classification Search

CPC ....... H01F 27/292; H01F 27/323; H01F 27/32
USPC .................................................. 336/192, 200
See application file for complete search history.

(56) References Cited

U.S. PATENT DOCUMENTS

2017/0032883 A1 2/2017 Hong et al.
2020/0135374 A1* 4/2020 You ......................... H01F 41/04
2020/0321155 A1 10/2020 Park et al.
2021/0257149 A1 8/2021 Okumura et al.
2022/0406519 A1* 12/2022 Kim ........................ H01F 17/04
2023/0137288 A1* 5/2023 Saxena ..................... G06T 7/62
382/109

FOREIGN PATENT DOCUMENTS

JP 2021-129105 A 9/2021
KR 10-1719914 B1 3/2017
KR 10-2020-0117700 A 10/2020
TW 201222584 A * 6/2012 ......... H01F 17/0013

* cited by examiner

*Primary Examiner* — Shawki S Ismail
*Assistant Examiner* — Joselito S. Baisa
(74) *Attorney, Agent, or Firm* — Morgan Lewis & Bockius LLP

(57) ABSTRACT

According to an aspect of the present disclosure, a coil component includes: a body having a first surface and a second surface opposing each other in a first direction, and a plurality of side surfaces connecting the first surface and the second surface to each other; a substrate disposed in the body; at least one insulating pattern disposed on at least one corner where two of the plurality of side surfaces of the body are in contact with each other and exposed to the two side surfaces of the body; a coil unit including a coil pattern disposed on at least one surface of the substrate with a plurality of turns, and lead-out portions respectively exposed to opposing ones of the plurality of side surfaces of the body; and external electrodes disposed on the body and connected to the lead-out portions, respectively.

20 Claims, 13 Drawing Sheets

COIL COMPONENT

CROSS-REFERENCE TO RELATED APPLICATION(S)

This application claims the benefit of priority to Korean Patent Application No. 10-2022-0005827 filed on Jan. 14, 2022 in the Korean Intellectual Property Office, the disclosure of which is incorporated herein by reference in its entirety.

TECHNICAL FIELD

The present disclosure relates to a coil component.

BACKGROUND

An inductor, one of coil components, is a typical passive electronic component used in an electronic device together with a resistor and a capacitor.

As electronic devices are increasingly improved in performance while their sizes become smaller, the number of electronic components used in the electronic devices has increased, and the sizes of the electronic components have decreased.

In order to realize a coil component with high capacity and high efficiency even in a small size, it is necessary to minimize a dicing margin of a chip component. In this process, in order to prevent a coil from being exposed to a surface of a body, it is necessary to check whether the coil is aligned with the center of the body.

SUMMARY

An aspect of the present disclosure may provide a coil component that can be determined from the outside for whether a coil unit is aligned with the center of a body.

Another aspect of the present disclosure may sort, in advance, a coil component that is highly likely to have an exposure defect of a coil unit at a later time.

Another aspect of the present disclosure may reduce a short circuit defect and a leakage defect caused when a coil unit is exposed to a surface of a body.

According to an aspect of the present disclosure, a coil component may include: a body having a first surface and a second surface opposing each other in a first direction, and a plurality of side surfaces connecting the first surface and the second surface to each other; a substrate disposed in the body; at least one insulating pattern disposed on at least one corner where two of the plurality of side surfaces of the body are in contact with each other and exposed to the two side surfaces of the body; a coil unit including a coil pattern disposed on at least one surface of the substrate with a plurality of turns, and lead-out portions respectively extending to opposing surfaces of the plurality of side surfaces of the body; and external electrodes disposed on the body and connected to the lead-out portions, respectively.

According to another aspect of the present disclosure, a coil component may include: a body having first and second surfaces opposing each other, and third and fourth surfaces connecting the first and second surfaces to each other and opposing each other; a substrate disposed in the body; a first insulating pattern disposed on a corner on which the first and third surfaces of the body are in contact with each other; a second insulating pattern disposed on a corner on which the second and fourth surfaces of the body are in contact with each other; a coil unit including first and second coil patterns disposed on both surfaces of the substrate, respectively, with a plurality of turns, a via penetrating through the substrate to connect the first and second coil patterns to each other, and first and second lead-out portions extending to the first and second surfaces of the body, respectively; and first and second external electrodes disposed on the body and connected to the first and second lead-out portions, respectively.

According to still another aspect of the present disclosure, a coil component may include: a body having first and second surfaces opposing each other; a substrate disposed in the body; a coil unit including a coil pattern disposed on at least one surface of the substrate with a plurality of turns, and first and second lead-out portions exposed to the first and second surfaces of the body, respectively; a first insulating pattern disposed in the body, exposed to the first surface of the body, and spaced apart from the substrate; a second insulating pattern disposed in the body, exposed to the second surface of the body, and spaced apart from the substrate; and first and second external electrodes disposed on the first and second surfaces of the body, respectively, and connected to the first and second lead-out portions, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
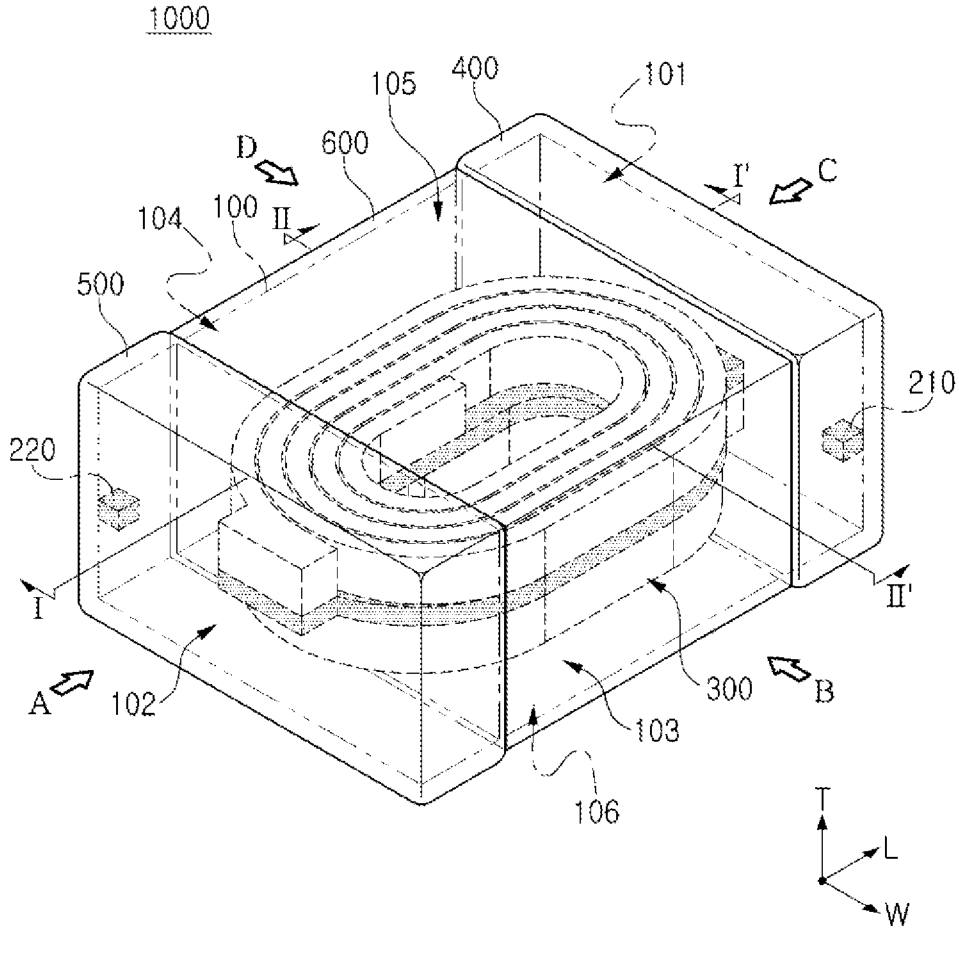
FIG. 1 is a schematic perspective view illustrating a coil component according to a first exemplary embodiment in the present disclosure.

Hereinafter, exemplary embodiments in the present disclosure will now be described in detail with reference to the accompanying drawings.

In the drawings, an L direction may be defined as a first direction or a length direction, a W direction may be defined as a second direction or a width direction, and a T direction may be defined as a third direction or a thickness direction.

Various kinds of electronic components may be used in electronic devices, and various kinds of coil components may be appropriately used between these electronic components to remove noise or for other purposes.

That is, in the electronic devices, the coil components may be used as power inductors, high frequency (HF) inductors, general beads, high frequency (GHz) beads, common mode filters, and the like.

First Exemplary Embodiment

Figure 2:
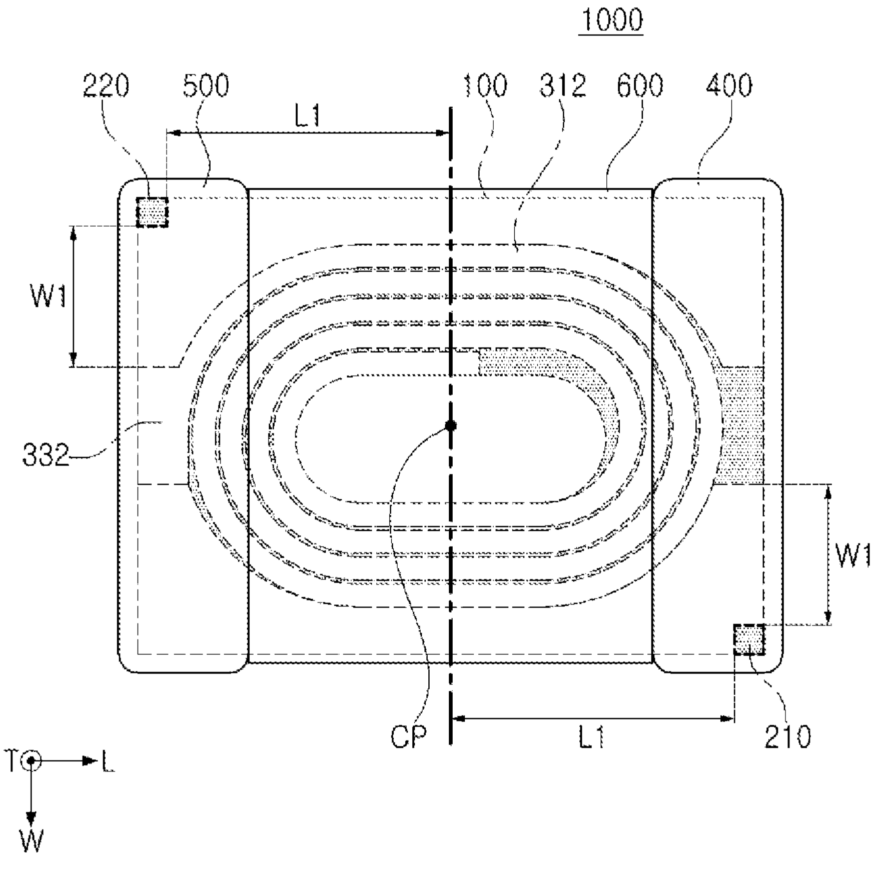
FIG. 2 is a schematic cross-sectional view of FIG. 1 in the length direction L-the width direction W.
Figure 4:
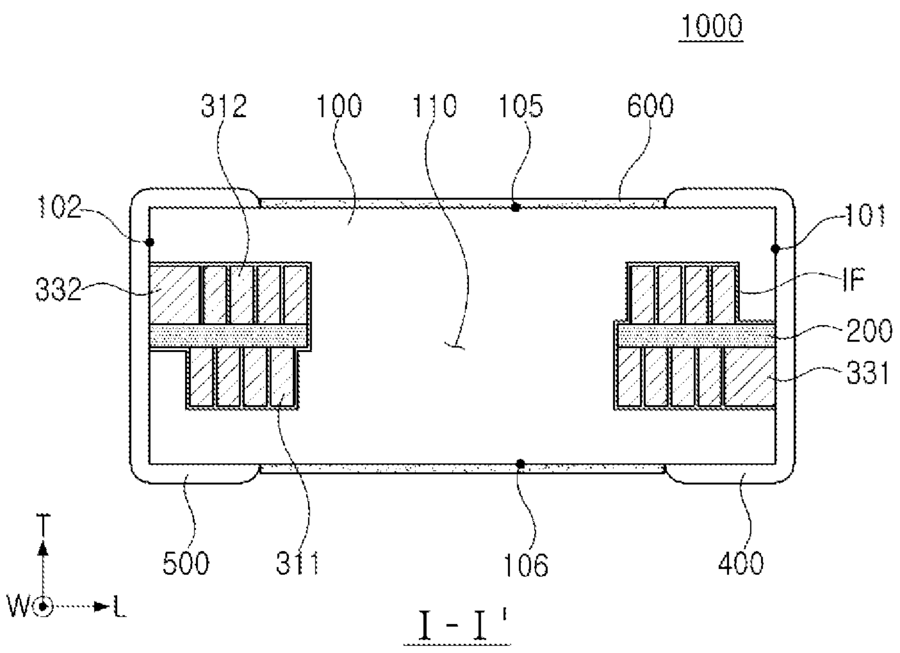
FIG. 4 is a cross-sectional view of FIG. 1 taken along line I-I'.
Figure 5:
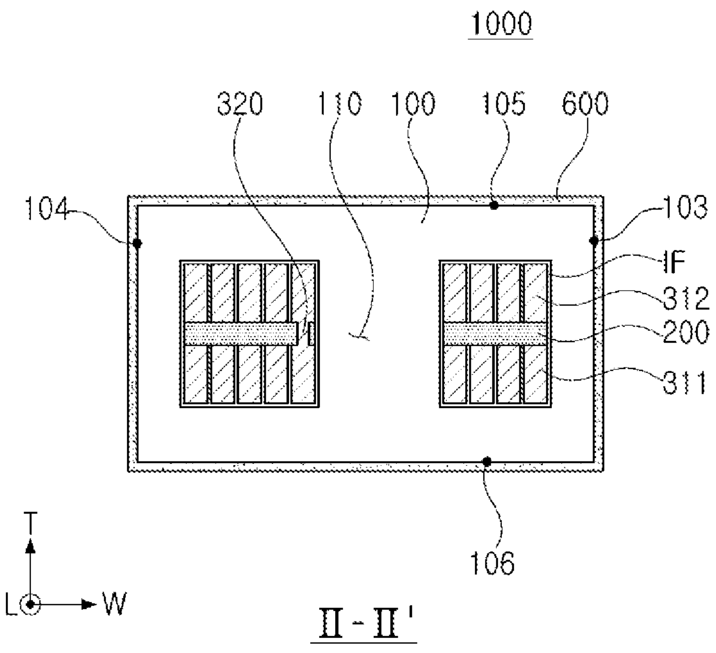
FIG. 5 is a cross-sectional view of FIG. 1 taken along line II-II'.

FIG. 1 is a schematic perspective view illustrating a coil component 1000 according to a first exemplary embodiment in the present disclosure. FIG. 2 is a schematic cross-sectional view of FIG. 1 in the length direction L-the width direction W. FIGS. 3A, 3B, 3C and 3D are sides views of FIG. 1 when viewed in directions A to D, respectively. FIG. 4 is a cross-sectional view of FIG. 1 taken along line I-I'. FIG. 5 is a cross-sectional view of FIG. 1 taken along line II-II'.

Referring to FIGS. 1 through 5, the coil component 1000 according to the first exemplary embodiment in the present disclosure may include a body 100, a substrate 200, insulating patterns 210 and 220, a coil unit 300, and external electrodes 400 and 500, and may further include an insulating layer 600.

The body 100 may form an appearance of the coil component 1000 according to the present exemplary embodiment, and the substrate 200 and the coil unit 300 may be embedded in the body 100.

The body 100 may generally have a hexahedral shape.

The body 100 may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T. The first to fourth surfaces 101 to 104 of the body 100 may be wall surfaces of the body 100 that connect the fifth surface 105 and the sixth surface 106 of the body 100 to each other.

The body 100 may be formed so that the coil component 1000 according to the present exemplary embodiment in which the external electrodes 400 and 500 to be described below are formed, for example, has a length of 2.5 mm, a width of 2.0 mm, and a thickness of 1.0 mm, has a length of 2.0 mm, a width of 1.2 mm, and a thickness of 0.65 mm, has a length of 1.6 mm, a width of 0.8 mm, and a thickness of 0.8 mm, has a length of 1.0 mm, a width of 0.5 mm, and a thickness of 0.8 mm, or has a length of 0.8 mm, a width of 0.4 mm, and a thickness of 0.65 mm, but is not limited thereto. Meanwhile, the above-described exemplary numerical values for the length, width, and thickness of the coil component 1000 refer to numerical values in which process errors are not reflected. Thus, numerical values including process errors in an allowable range may be considered to fall within the above-described exemplary numerical values.

Based on an image of a cross section of the coil component 1000 in the length direction L-thickness direction T taken at a central portion thereof in the width direction W using an optical microscope or a scanning electron microscope (SEM), the above-mentioned length of the coil component 1000 may refer to a maximum value among dimensions of a plurality of line segments spaced apart from each other in the thickness direction T, each connecting two outermost boundary lines opposing each other in the length direction L of the coil component 1000 in parallel to the length direction L in the image. Alternatively, the length of the coil component 1000 may refer to a minimum value among the dimensions of the plurality of line segments described above. Alternatively, the length of the coil component 1000 may refer to an arithmetic mean value of at least three among the dimensions of the plurality of line segments described above. Here, the plurality of line segments parallel to the length direction L may be equally spaced from each other in the thickness direction T, but the scope of the present disclosure is not limited thereto.

Based on an image of a cross section of the coil component 1000 in the length direction L-thickness direction T taken at a central portion thereof in the width direction W using an optical microscope or a scanning electron microscope (SEM), the above-mentioned thickness of the coil component 1000 may refer to a maximum value among dimensions of a plurality of line segments spaced apart from each other in the length direction L, each connecting two outermost boundary lines opposing each other in the thickness direction T of the coil component 1000 in parallel to the thickness direction T in the image. Alternatively, the thickness of the coil component 1000 may refer to a minimum value among the dimensions of the plurality of line segments described above. Alternatively, the thickness of the coil component 1000 may refer to an arithmetic mean value of at least three among the dimensions of the plurality of line segments described above. Here, the plurality of line segments parallel to the thickness direction T may be equally spaced from each other in the length direction L, but the scope of the present disclosure is not limited thereto.

Based on an image of a cross section of the coil component 1000 in the length direction L-width direction W taken at a central portion thereof in the thickness direction T using an optical microscope or a scanning electron microscope (SEM), the above-mentioned width of the coil component 1000 may refer to a maximum value among dimensions of a plurality of line segments spaced apart from each other in the length direction L, each connecting two outermost boundary lines opposing each other in the width direction W of the coil component 1000 in parallel to the width direction W in the image. Alternatively, the width of the coil component 1000 may refer to a minimum value among the dimensions of the plurality of line segments described above. Alternatively, the width of the coil component 1000 may refer to an arithmetic mean value of at least three among the dimensions of the plurality of line segments described above. Here, the plurality of line segments parallel to the width direction W may be equally spaced from each other in the length direction L, but the scope of the present disclosure is not limited thereto.

Alternatively, each of the length, width, and thickness of the coil component 1000 may be measured by a micrometer measurement method. In the micrometer measurement method, each of the length, width, and thickness of the coil component 1000 may be measured by setting a zero point using a micrometer having gage repeatability and reproducibility (R&R), inserting the coil component 1000 according to the present exemplary embodiment between tips of the micrometer, and turning a measurement lever of the micrometer. Meanwhile, concerning the measurement of the length of the coil component 1000 by the micrometer measurement method, the length of the coil component 1000 may refer to a value measured once, or may refer to an arithmetic mean of values measured multiple times. The same may also be applied to the width and the thickness of the coil component 1000. Other measurement methods and/or tools appreciated by one of ordinary skill in the art, even if not described in the present disclosure, may also be used.

The body 100 may include a magnetic material and a resin. Specifically, the body 100 may be formed by stacking one or more magnetic composite sheets 11 in which the magnetic material is dispersed in the resin. However, the body 100 may also have a structure other than the structure in which the magnetic material is dispersed in the resin. For example, the body 100 may be made of a magnetic material such as ferrite, or may be made of a non-magnetic material.

The magnetic material may be ferrite or metal magnetic powder.

The ferrite may be, for example, one or more of spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrite such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

The metal magnetic powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder may be one or more of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Si—Cu—Nb-based alloy powder, Fe—Ni—Cr-based alloy powder, and Fe—Cr—Al-based alloy powder.

The metal magnetic powder may be amorphous or crystalline. For example, the metal magnetic powder may be Fe—Si—B—Cr-based amorphous alloy powder, but is not necessarily limited thereto.

Each of the ferrite and the metal magnetic powder may have an average particle diameter of about 0.1 μm to 30 μm, but is not limited thereto.

The body 100 may include two or more types of magnetic materials dispersed in the resin. Here, the different types of magnetic materials mean that the magnetic materials dispersed in the resin are distinguished from each other in terms of any one of average particle diameter, composition, crystallinity, and shape.

The resin may include an epoxy, a polyimide, a liquid crystal polymer (LCP), or a mixture thereof, but is not limited thereto.

The body 100 may include a core 110 penetrating through the substrate and the coil unit 300 to be described below. The core 110 may be formed by filling a through hole 110*h* of the coil unit 300 with the magnetic composite sheets 11, but is not limited thereto.

The substrate 200 may be disposed in the body 100. The substrate 200 may be a component supporting the coil unit 300 to be described below.

The substrate 200 may be formed of an insulating material including a thermosetting insulating resin such as an epoxy resin, a thermoplastic insulating resin such as a polyimide resin, or a photosensitive insulating resin, or may be formed of an insulating material in which a reinforcing material such as a glass fiber or an inorganic filler is impregnated in such an insulating resin. As an example, the substrate 200 may be formed of prepreg, an Ajinomoto build-up film (ABF), FR-4, a bismaleimide triazine (BT) resin, a photo-imageable dielectric (PID), a copper clad laminate (CCL), or the like, but is not limited thereto.

The inorganic filler may be at least one selected from the group consisting of silica ($SiO_2$), alumina ($Al_2O_3$), silicon carbide (SiC), barium sulfate ($BaSO_4$), talc, clay, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the substrate 200 is formed of an insulating material including a reinforcing material, the substrate 200 may provide more excellent rigidity. When the substrate 200 is formed of an insulating material including no glass fiber, a total thickness of the substrate 200 and the coil unit 300 (which refers to the sum of dimensions of the coil unit 300 and the substrate 200 in the thickness direction T of FIG. 1) may decrease, which is advantageous in decreasing a thickness of the coil component. When the substrate 200 is formed of an insulating material including a photosensitive insulating resin, the number of processes for forming the coil unit 300 may decrease, which is advantageous in decreasing a production cost and in forming a fine via 320. The substrate 200 may have a thickness of, for example, 10 μm or more and 50 μm or less, but is not limited thereto.

The coil component 1000 according to the first exemplary embodiment in the present disclosure may include insulating patterns 210 and 220 respectively disposed on at least one corner where two of the side surfaces of the body 100 are in contact with each other to be exposed to the two side surfaces of the body 100.

The insulating patterns 210 and 220, which are exposed to the surfaces of the body 100 after dicing processing, are components for checking from the outside whether the coil unit 300 is aligned with the center of the body. Based on locations of the insulating patterns 210 and 220, shapes of the insulating patterns 210 and 220, whether or not the insulating patterns 210 and 220 are observable, etc, a distance of the coil unit 300 from a surface of the body 100 can be determined, thereby making it possible to sort, in advance, a coil component that is likely to have an exposure defect of the coil unit 300 at a later time even though the coil unit 300 is not actually exposed to the surface of the body 100.

Referring to FIG. 2, the insulating patterns 210 and 220 may include a first insulating pattern 210 and a second insulating pattern 220 spaced apart from each other. The first insulating pattern 210 and the second insulating pattern 220 may be disposed to face each other in a diagonal direction passing the winding center Cp of coil patterns 311 and 312 to be described below, in the image of the cross section of the coil component 1000 in the length direction L-width direction W. That is, the first insulating pattern 210 and the second insulating pattern 220 may be disposed to be symmetrical about the origin with respect to the winding center Cp of the coil patterns 311 and 312 to be described below or the center of the through hole 110*h* of the substrate 200.

Each of the first insulating pattern 210 and the second insulating pattern 220 may have a tetragonal shape in the image of the cross section of the coil component 1000 in the length direction L-width direction W, and may have a dimension in the length direction L or the width direction W that varies depending on a dicing location in the dicing processing.

Referring to FIGS. 2 and 3, each of the insulating patterns 210 and 220 may be disposed to be spaced apart from each of lead-out portions 331 and 332 at a predetermined interval W1 on one side surface of the body 100 to which each of the insulating patterns 210 and 220 and each of the lead-out portions 331 and 332 are exposed.

For example, the first lead-out portion 331 and the first insulating pattern 210 may be exposed to the first surface 101 of the body 100, and the first lead-out portion 331 and the first insulating pattern 210 may be spaced apart from each other by the predetermined distance W1 in the width direction W. Also, the second lead-out portion 332 and the second insulating pattern 220 may be exposed to the second surface 102 of the body 100, and the second lead-out portion 332 and the second insulating pattern 220 may be spaced apart from each other by the predetermined distance W1 in the width direction W.

The distance between the first lead-out portion 331 and the first insulating pattern 210 may be substantially the same as the distance between the second lead-out portion 332 and the second insulating pattern 220. Here, the substantially same distance refers to a distance including a process error or a positional deviation occurring during a manufacturing process and an error occurring during measurement.

Based on an image of the coil component 1000 captured by an optical microscope or a scanning electron microscope (SEM) in a direction toward the first or second surface 101 or 102 of the body 100 in a state where the external electrodes 400 and 500 are eliminated from the coil component 1000, the above-mentioned distance W1 between each of the insulating patterns 210 and 220 and each of the lead-out portions 331 and 332 spaced apart from each other in the width direction W may refer to an arithmetic mean value of at least three among dimensions of a plurality of line segments spaced apart from each other in the length direction L, each connecting two outermost boundary lines opposing each other in the width direction W in parallel to the width direction W between each of the insulating patterns 210 and 220 and the substrate 200, which corresponds to each of the lead-out portions 331 and 332 in shape, in the image. Here, the plurality of line segments parallel to the width direction W may be equally spaced from each other in the thickness direction T, but the scope of the present disclosure is not limited thereto.

By disposing each of the insulating patterns 210 and 220 to be spaced apart from each of the lead-out portions 331 and 332 by the predetermined distance W1 as described above, a location of the coil unit 300 including the lead-out portions 331 and 332 in the body 100 and whether the coil unit 300 is aligned with the center of the body 100 in the width direction W can be determined through the insulating patterns 210 and 220 observable from the outside of the body 100.

Referring to FIG. 2, each of the insulating patterns 210 and 220 may be disposed to be spaced apart by a predetermined distance L1 from a plane passing the winding center CP of the coil patterns 311 and 312 in parallel to one side surface of the body to which each of the lead-out portions 331 and 332 is exposed.

For example, based on a virtual plane passing the winding center CP of the coil patterns 311 and 312 or the center of the through hole 110*h* of the substrate 200 among planes perpendicular to the length direction (L direction), the first insulating pattern 210 and the virtual plane may be spaced apart from each other by the predetermined distance L1 in the length direction (L direction). Also, the second insulating pattern 220 and the virtual plane may be spaced apart from each other by the predetermined distance L1 in the length direction (L direction).

The distance between the first insulating pattern 210 and the virtual plane may be substantially the same as the distance between the second insulating pattern 220 and the virtual plane. Here, the substantially same distance refers to a distance including a process error or a positional deviation occurring during a manufacturing process and an error occurring during measurement.

Based on an image of a cross section of the coil component 1000 in the length direction L-width direction W taken at a central portion thereof in the thickness direction T using an optical microscope or a scanning electron microscope (SEM), the above-mentioned distance L1 in the length direction L between each of the insulating patterns 210 and 220 and the plane passing the winding center CP of the coil patterns 311 and 312 or the center of the through hole 110*h* of the substrate 200 may refer to an arithmetic mean value of at least three among dimensions of a plurality of line segments spaced apart from each other in the width direction W, each connecting two outermost boundary lines opposing each other in the length direction L in parallel to the length direction L between each of the insulating patterns 210 and 220 and a virtual center line passing the winding center CP of the coil patterns 311 and 312 or the center of the through hole 110*h* of the substrate 200 in parallel to the width direction W in the image. Here, the plurality of line segments parallel to the length direction L may be equally spaced from each other in the width direction W, but the scope of the present disclosure is not limited thereto. Other measurement methods and/or tools appreciated by one of ordinary skill in the art, even if not described in the present disclosure, may also be used.

By disposing each of the insulating patterns 210 and 220 to be spaced apart from the plane passing the winding center CP of the coil patterns 311 and 312 or the center of the through hole 110*h* of the substrate 200 by the predetermined distance L1 as described above, a location of the coil unit 300 in the body 100 and whether the coil unit 300 is aligned with the center of the body 100 in the length direction L can be determined through the insulating patterns 210 and 220 observable from the outside of the body 100. In particular, it is possible to check whether the coil unit 300 is aligned with the center of the body 100 in the length direction L through the third or fourth surface 103 or 104 of the body 100 to which the substrate 200 and the lead-out portions 331 and 332 are not exposed.

FIGS. 3A, 3B, 3C and 3D are sides views of FIG. 1 when viewed in directions A, B, C and D, respectively.

Figure 3A:
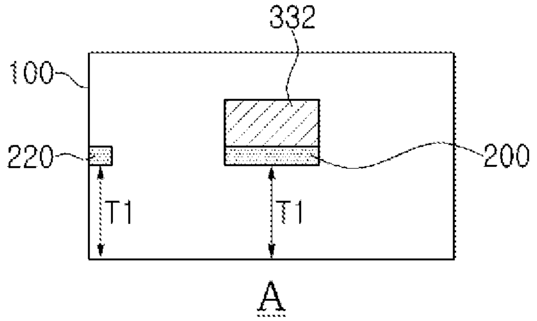
FIGS. 3A, 3B, 3C and 3D are sides views of FIG. 1 when viewed in directions A to D, respectively.
Figure 3B:
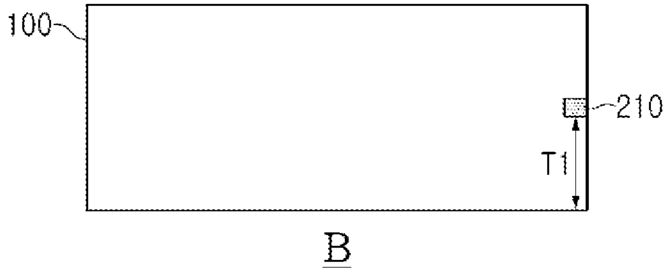
Figure 3C:
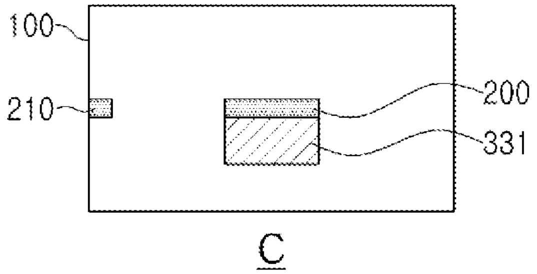
Figure 3D:
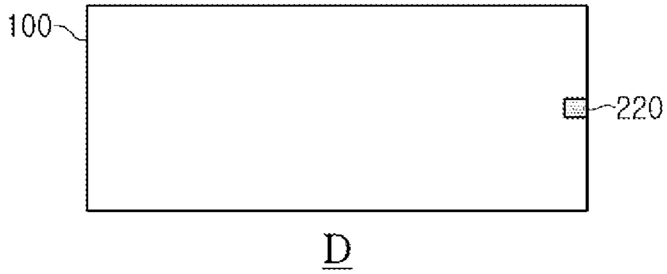

Referring to FIGS. 3A and 3B, the insulating patterns 210 and 220 may be disposed to be spaced apart from the substrate 200 at substantially the same height T1 as the substrate 200 based on the thickness direction T. Here, the substantially same height refers to a height including a process error or a positional deviation occurring during a manufacturing process and an error occurring during measurement.

The insulating patterns 210 and 220 may be formed at substantially the same level, that is, at the same height T1, as the substrate 200 because they are formed by partial portions of the substrate 200 remaining after the dicing processing.

Here, based on an image of the coil component 1000 captured by an optical microscope or a scanning electron microscope (SEM) in a direction toward the first or second surface 101 or 102 of the body 100 in a state where the external electrodes 400 and 500 are eliminated from the coil component 1000, the height T1 of each of the insulating patterns 210 and 220 and the substrate 200 may refer to an arithmetic mean value of at least three among dimensions of a plurality of line segments spaced apart from each other in the width direction W, each connecting two outermost boundary lines opposing each other in the thickness direction T in parallel to the thickness direction T between each of the insulating patterns 210 and 220 or the substrate 200 and the sixth surface 106 of the body 100 in the image. Here, the plurality of line segments parallel to the thickness direction T may be equally spaced from each other in the width direction W, but the scope of the present disclosure is not limited thereto.

Referring to FIGS. 3A, 3B, 3C and 3D, a pair of insulating patterns 210 and 220 opposing each other in the diagonal direction make it possible to check whether the coil unit 300 is aligned with the center of the body in any of directions A to D from the four side surfaces of the body 100. The coil component 1000 according to the present exemplary embodiment represents an example in which the coil unit 300 is not misaligned with the center of the body.

The insulating patterns 210 and 220 may contain the same ingredient as the substrate 200 because they are formed by partial portions of the substrate 200 remaining after the dicing processing.

The insulating patterns 210 and 220 may be formed of an insulating material including a thermosetting insulating resin such as an epoxy resin, a thermoplastic insulating resin such as a polyimide resin, or a photosensitive insulating resin, or may be formed of an insulating material in which a reinforcing material such as a glass fiber or an inorganic filler is impregnated in such an insulating resin. As an example, the insulating patterns 210 and 220 may be formed of an insulating material such as prepreg, an Ajinomoto build-up film (ABF), FR-4, a bismaleimide triazine (BT) resin, a photoimageable dielectric (PID), a copper clad laminate (CCL), or the like, but is not limited thereto.

The coil unit 300 may be disposed on the substrate 200. The coil unit 300 may be embedded in the body 100 to exhibit characteristics of the coil component. For example, when the coil component 1000 according to the present exemplary embodiment is utilized as a power inductor, the coil unit 300 may serve to stabilize power of an electronic device by storing an electric field as a magnetic field and maintaining an output voltage.

The coil unit 300 is formed on at least one of opposite surfaces of the substrate 200 with at least one turn. In the present exemplary embodiment, the coil unit 300 may include coil patterns 311 and 312, a via 320, and lead-out portions 331 and 332.

Referring to FIG. 4, the first coil pattern 311 and the second coil pattern 312 may be disposed on the opposite surfaces of the substrate 200, respectively, each having a planar spiral shape in which at least one turn is formed around the core 110 of the body 100. For example, based on the directions of FIG. 1, the first coil pattern 311 may be disposed on a lower surface of the substrate 200 with at least one turn formed around the core 110. The second coil pattern 312 may be disposed on an upper surface of the substrate 200 with at least one turn formed around the core 110. The first and second coil patterns 311 and 312 may be formed in such a manner that respective ends of outermost turns thereof connected to the lead-out portions 331 and 332 extend in directions toward the first and second surfaces 101 and 102 of the body 100, respectively.

Referring to FIG. 5, the via 320 may penetrate through the substrate 200 to connect inner end portions of respective innermost turns of the first and second coil patterns 311 and 312 to each other.

The first lead-out portion 331 may be exposed to the first surface 101 of the body 100 to be connected in contact with the first external electrode 400 to be described below, and the second lead-out portion 332 may be exposed to the second surface 102 of the body 100 to be connected in contact with the second external electrode 500 to be described below.

Through this structure, the coil unit 300 may function as a single coil as a whole.

At least one of the coil patterns 311 and 312, the via 320, and the lead-out portions 331 and 332 may include at least one conductive layer.

For example, when the first coil pattern 311, the via 320, and the first lead-out portion 331 are plated on the lower surface of the substrate 200 (based on the directions of FIG. 1), each of the first coil pattern 311, the via 320, and the first lead-out portion 331 may include a seed layer and an electrolytic plating layer. The seed layer may be formed by an electroless plating method or a vapor deposition method such as sputtering. Each of the seed layer and the electrolytic plating layer may have a single-layer structure or have a multi-layer structure. The electrolytic plating layer having the multi-layer structure may be formed in a conformal film structure in which one electrolytic plating layer covers another electrolytic plating layer, or may be formed by stacking one electrolytic plating layer on only one surface of another electrolytic plating layer. The seed layer of the first coil pattern 311, the seed layer of the via 320, and the seed layer of the first lead-out portion 331 may be integrally formed, such that no boundaries are formed therebetween, but are not limited thereto. The electrolytic plating layer of the first coil pattern 311, the electrolytic plating layer of the via 320, and the electrolytic plating layer of the first lead-out portion 331 may be integrally formed, such that no boundaries are formed therebetween, but are not limited thereto.

Each of the coil patterns 311 and 312, the via 320, and the lead-out portions 331 and 332 may include a conductive material such as copper (Cu), aluminum (Al), silver (Ag), tin (Sn), gold (Au), nickel (Ni), lead (Pb), titanium (Ti), chromium (Cr), molybdenum (Mo), or an alloy thereof, but is not limited thereto.

The external electrodes 400 and 500 may be disposed on the first and second surfaces 101 and 102 of the body 100, respectively, to be connected to the first and second lead-out portions 331 and 332, respectively. Specifically, the first external electrode 400 may be disposed on the first surface 101 of the body 100 to be connected in contact with the first lead-out portion 331. Also, the second external electrode 500 may be disposed on the second surface 102 of the body 100 to be connected in contact with the second lead-out portion 332.

When the coil component 1000 according to the present exemplary embodiment is mounted on a printed circuit board or the like, the external electrodes 400 and 500 may electrically connect the coil component 1000 to the printed circuit board or the like. For example, the external electrodes 400 and 500 disposed on the first and second surfaces 101 and 102 of the body 100, respectively, to be spaced apart from each other may be electrically connected to connectors of the printed circuit board.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or an alloy thereof, but are not limited thereto.

Each of the external electrodes 400 and 500 may be formed as a plurality of layers. For example, the first external electrode 400 may include a first layer contacting the first lead-out portion 331 and a second layer disposed on the first layer. Here, the first layer may be a conductive resin layer including a conductive powder including at least one of copper (Cu) and silver (Ag) and an insulating resin, or a copper (Cu) plating layer. The second layer may have a double-layer structure of a nickel (Ni) plating layer and a tin (Sn) plating layer.

An insulating film IF may be disposed between the coil unit 300 and the body 100 to cover the coil unit 300. The insulating film IF may be formed along the surfaces of the substrate 200 and the coil unit 300. The insulating film IF may be provided to insulate the coil unit 300 from the body 100, and may include a known insulating material such as parylene, but is not limited thereto. The insulating film IF may be formed by a vapor deposition method or the like, but is not limited thereto. Alternatively, the insulating film IF may be formed by stacking insulation films on both surfaces of the substrate 200.

Meanwhile, the coil component 1000 according to the present exemplary embodiment may further include an insulating layer 600 covering the third to sixth surfaces 103 to 106 of the body 100, except for regions where the external electrodes 400 and 500 are disposed.

The insulating layer 600 may be formed by, for example, applying an insulating material including an insulating resin onto the surfaces of the body 100, and then curing the insulating material. In this case, the insulating layer may include at least one of a thermoplastic resin such as polystyrene, vinyl acetate, polyester, polyethylene, polypropylene, polyamide, rubber, or acryl, a thermosetting resin such as phenol, epoxy, urethane, melamine, or alkyd, and a photosensitive insulating resin.

Second Exemplary Embodiment

Figure 6:
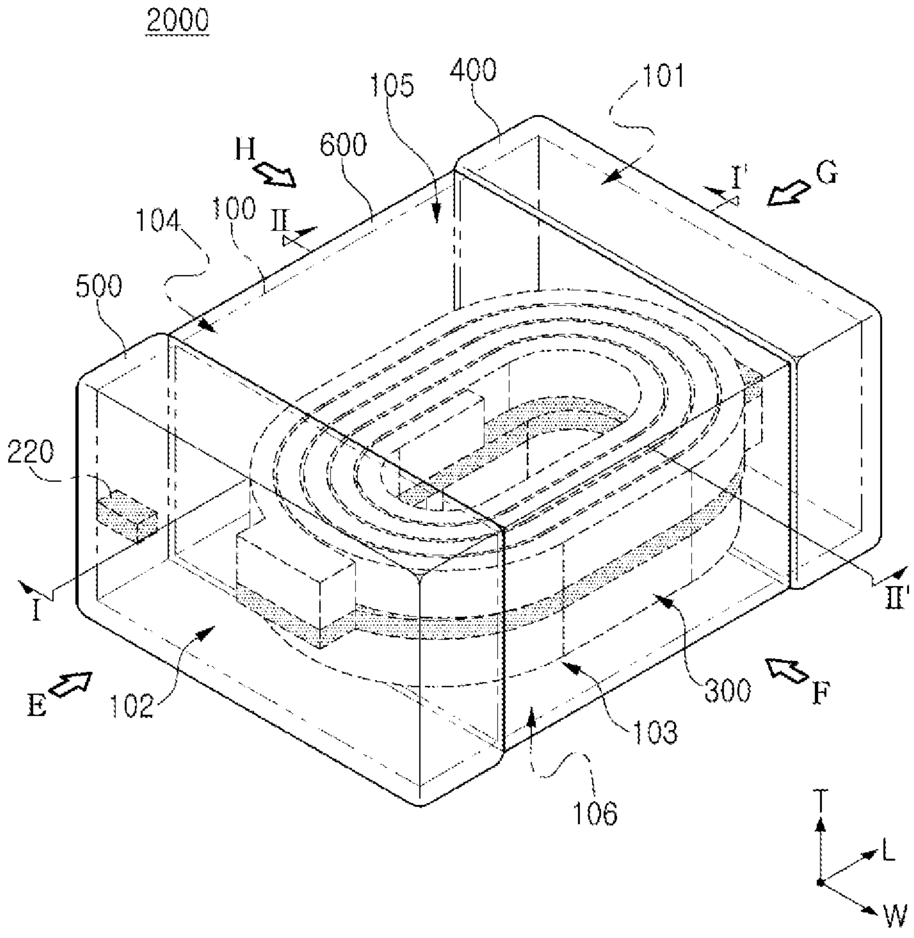
FIG. 6 is a schematic perspective view illustrating a coil component according to a second exemplary embodiment in the present disclosure.
Figure 7:
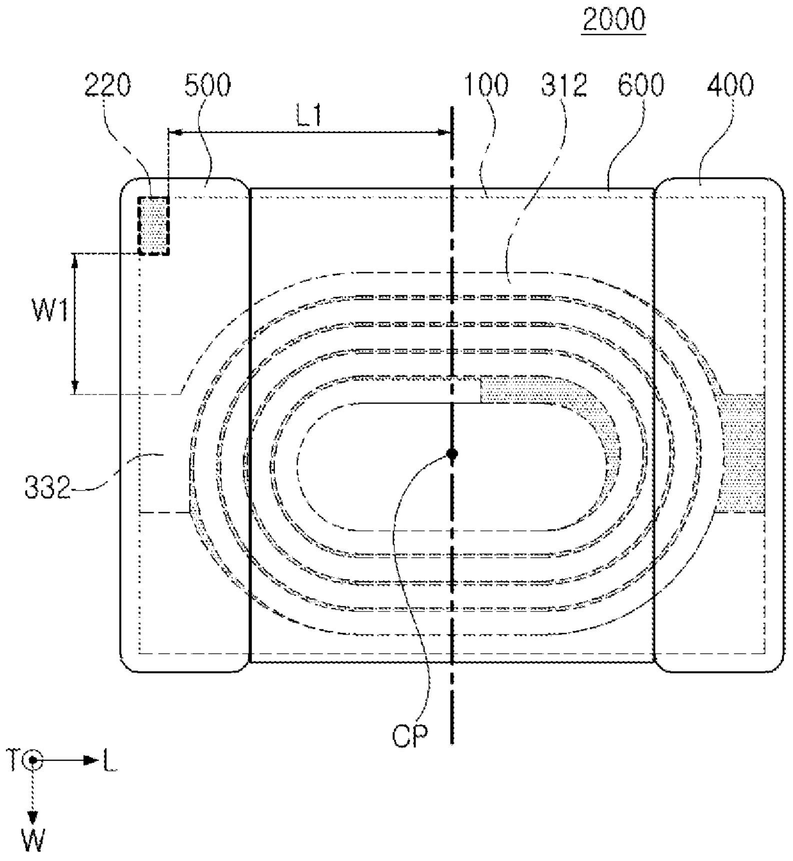
FIG. 7 is a schematic cross-sectional view of FIG. 6 in the length direction L-the width direction W.
Figure 8A:
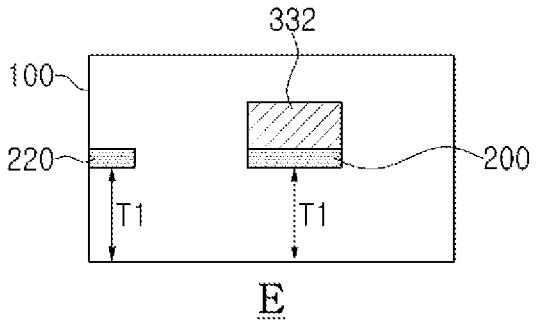
FIGS. 8A, 8B, 8C and 8D are sides views of FIG. 6 when viewed in directions E to H, respectively.
Figure 8B:
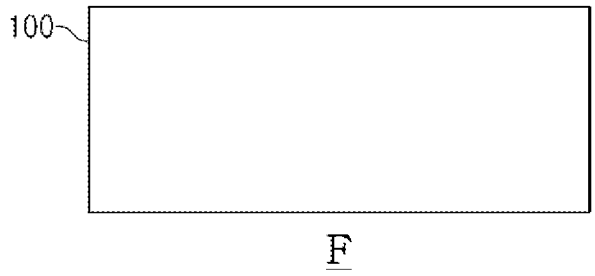
Figure 8C:
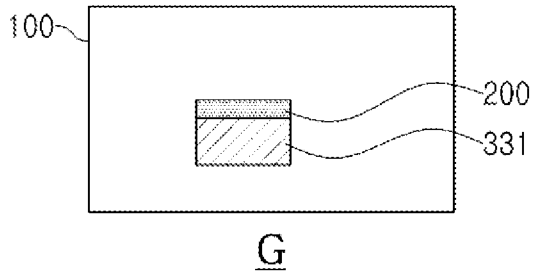
Figure 8D:
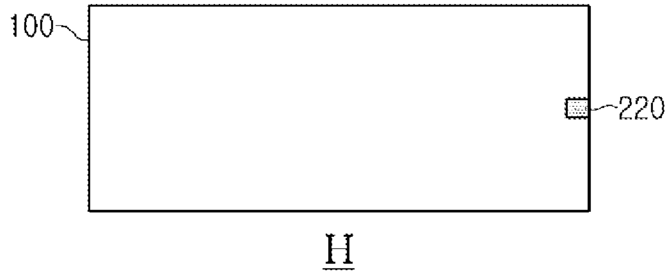

FIG. 6 is a schematic perspective view illustrating a coil component 2000 according to a second exemplary embodiment in the present disclosure. FIG. 7 is a schematic cross-sectional view of FIG. 6 in the length direction L-the width direction W. FIGS. 8A, 8B, 8C and 8D are sides views of FIG. 6 when viewed in directions E to H, respectively.

Upon comparing FIGS. 6 through 8 with FIGS. 1 through 3, respectively, the coil component 2000 according to the second exemplary embodiment in the present disclosure is different from the coil component 1000 according to the first exemplary embodiment in the present disclosure in whether the substrate 200 and the coil unit 300 are aligned with the center of the body, whether the insulating patterns 210 and 220 are observable, locations of the insulating patterns 210 and 220, shapes of the insulating patterns 210 and 220, etc.

Thus, in describing the present exemplary embodiment, only the locations of the substrate 200 and the coil unit 300 and the insulating patterns 210 and 220, which are different from those of the first exemplary embodiment in the present disclosure, will be described. Concerning the other configurations of the present exemplary embodiment, what has been described above for the first exemplary embodiment in the present disclosure may be identically applied thereto.

Referring to FIGS. 6 through 8, the coil component 2000 according to the present exemplary embodiment has the same size as that in the first exemplary embodiment, but has a structure in which the coil unit 300 is misaligned with the center of the body 100 and is biased to one side surface of the body 100 in the width direction W.

The coil component 2000 according to the present exemplary embodiment may be formed such that the coil unit 300 is close to the third surface 103 of the body 100 due to some misalignment in the width direction W in the dicing processing of the manufacturing process to be described below, and accordingly, the first insulating pattern 210 is removed together in the dicing processing and the second insulating pattern 220 is long in the width direction W.

Referring to FIG. 7, in the coil component 2000 according to the present exemplary embodiment as well, the second insulating pattern 220 and the second lead-out portion 332 may be spaced apart from each other by the predetermined distance W1. Also, the second insulating pattern 220 may be spaced apart from the plane passing the winding center CP of the coil patterns 311 and 312 or the center of the through hole 110*h* of the substrate 200 by the predetermined distance L1.

Referring to FIG. 8, when the coil component 2000 according to the present exemplary embodiment is viewed in direction E, the second insulating pattern 220 may be formed to be long in the width direction W. In addition, as a result of the misalignment of the coil unit 300 in the width direction W in the dicing processing, the first insulating pattern 210 is not observed.

Therefore, even though the coil component 2000 according to the present exemplary embodiment does not have a defect that the coil unit 300 is exposed to the surface of the body 100, it can be visually confirmed that the coil unit 300 is biased to one side surface of the body, thereby sorting out the coil component 2000 in advance as a coil component that is highly likely to have an exposure defect of the coil unit 300.

Third Exemplary Embodiment

Figure 9:
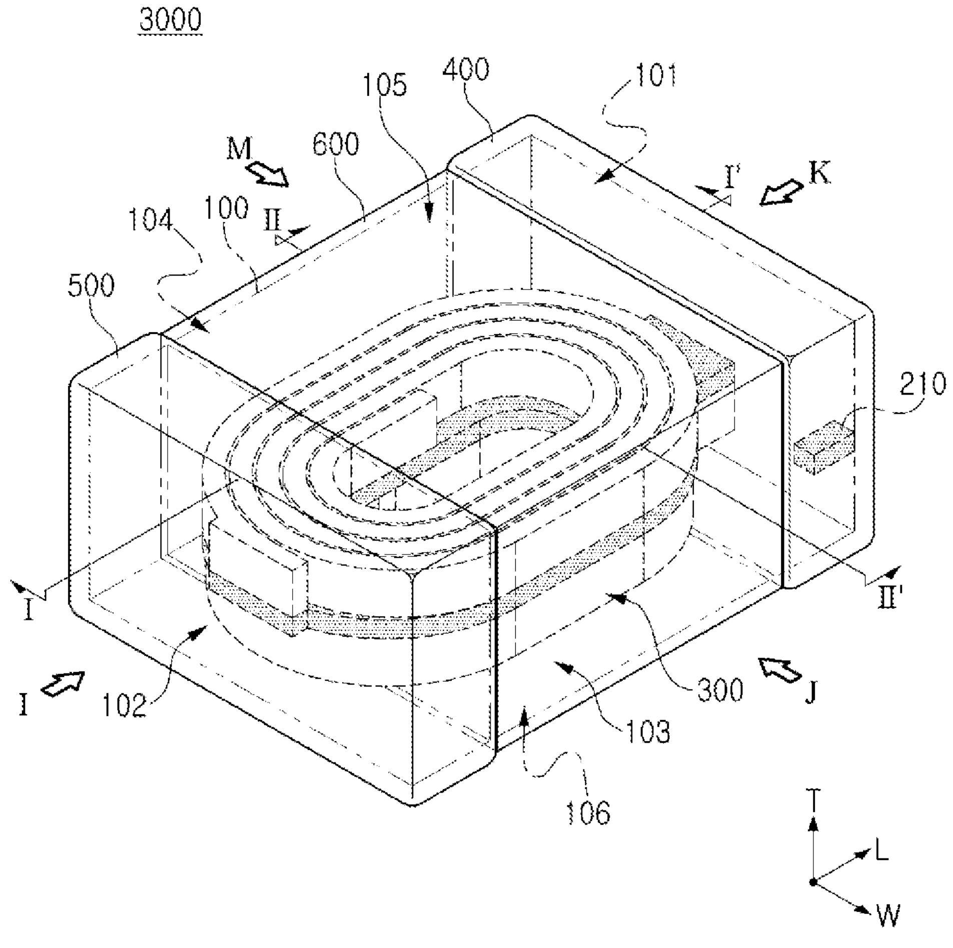
FIG. 9 is a schematic perspective view illustrating a coil component according to a third exemplary embodiment in the present disclosure.
Figure 10:
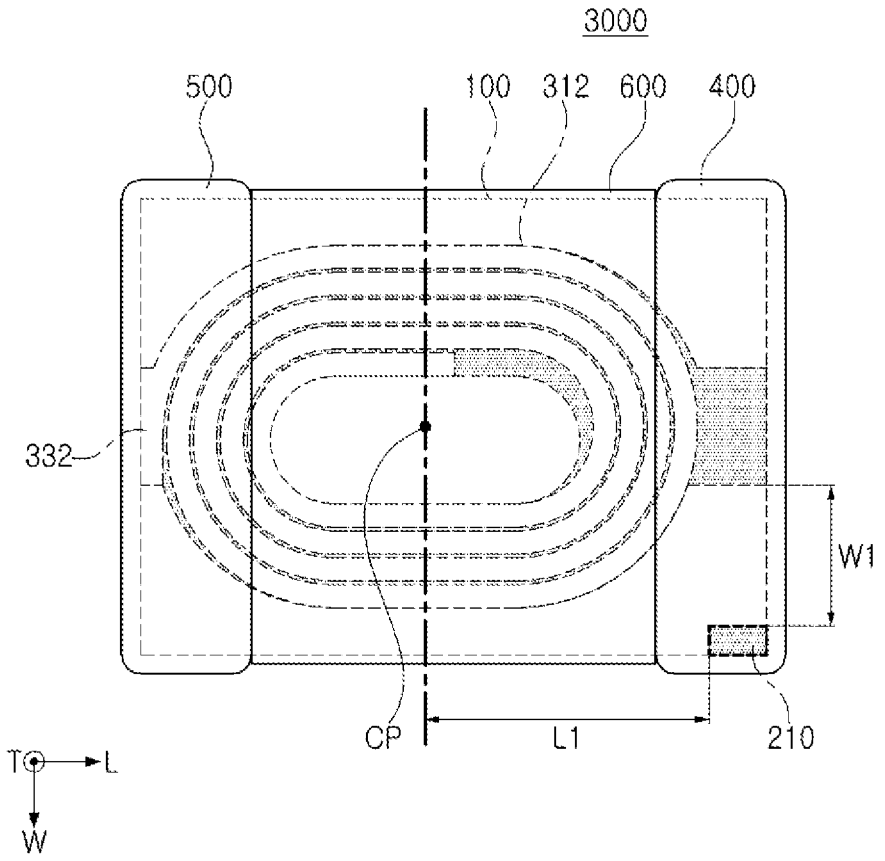
FIG. 10 is a schematic cross-sectional view of FIG. 9 in the length direction L-the width direction W.
Figure 11A:
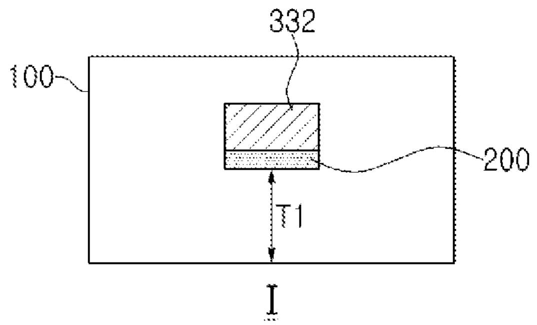
FIGS. 11A, 11B, 11C and 11D are sides views of FIG. 9 when viewed in directions I to M, respectively.
Figure 11B:
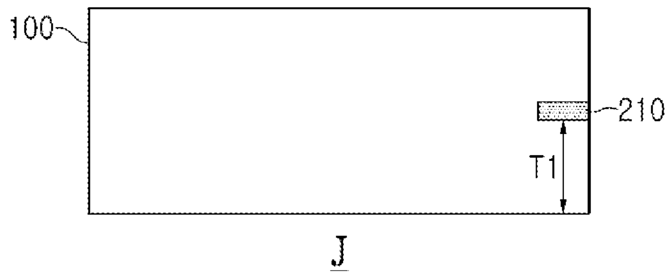
Figure 11C:
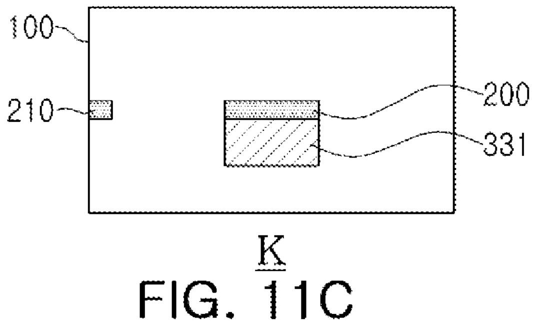
Figure 11D:
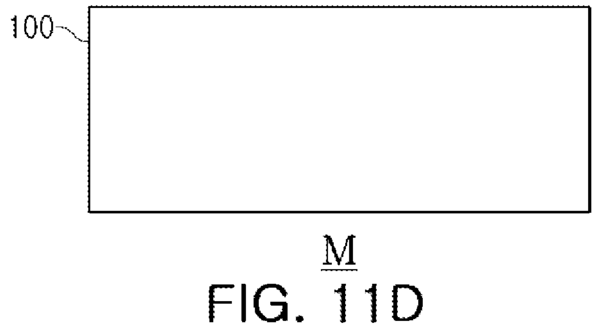

FIG. 9 is a schematic perspective view illustrating a coil component 3000 according to a third exemplary embodiment in the present disclosure. FIG. 10 is a schematic cross-sectional view of FIG. 9 in the length direction L-the width direction W. FIGS. 11A, 11B, 11C and 11D are sides views of FIG. 9 when viewed in directions I to M, respectively.

Upon comparing FIGS. 9 through 11 with FIGS. 1 through 3, respectively, the coil component 3000 according to the third exemplary embodiment in the present disclosure is different from the coil component 1000 according to the first exemplary embodiment in the present disclosure in whether the substrate 200 and the coil unit 300 are aligned with the center of the body, whether the insulating patterns 210 and 220 are observable, locations of the insulating patterns 210 and 220, shapes of the insulating patterns 210 and 220, etc.

Thus, in describing the present exemplary embodiment, only the locations of the substrate 200 and the coil unit 300 and the insulating patterns 210 and 220, which are different from those of the first exemplary embodiment in the present disclosure, will be described. Concerning the other configurations of the present exemplary embodiment, what has been described above for the first exemplary embodiment in the present disclosure may be identically applied thereto.

Referring to FIGS. 9 through 11, the coil component 3000 according to the present exemplary embodiment has the same size as that in the first exemplary embodiment, but has a structure in which the coil unit 300 is misaligned with the center of the body 100 and is biased to one side surface of the body 100 in the length direction L.

The coil component 3000 according to the present exemplary embodiment may be formed such that the coil unit 300 is close to the second surface 102 of the body 100 due to some misalignment in the length direction L in the dicing processing of the manufacturing process to be described below, and accordingly, the second insulating pattern 220 is removed together in the dicing processing and the first insulating pattern 210 is long in the length direction L.

Referring to FIG. 10, in the coil component 3000 according to the present exemplary embodiment as well, the first insulating pattern 210 and the first lead-out portion 331 may be spaced apart from each other by the predetermined distance W1. Also, the first insulating pattern 210 may be spaced apart from the plane passing the winding center CP of the coil patterns 311 and 312 or the center of the through hole 110*h* of the substrate 200 by the predetermined distance L1.

Referring to FIG. 11, when the coil component 3000 according to the present exemplary embodiment is viewed in direction J, the first insulating pattern 210 may be formed to be long in the length direction L. In addition, as a result of the misalignment of the coil unit 300 in the length direction L in the dicing processing, the second insulating pattern 220 is not observed.

Therefore, even though the coil component 3000 according to the present exemplary embodiment does not have a defect that the coil unit 300 is exposed to the surface of the body 100, it can be visually confirmed that the coil unit 300 is biased to one side surface of the body, thereby sorting out the coil component 3000 in advance as a coil component that is highly likely to have an exposure defect of the coil unit 300.

Manufacturing Process

Figure 12:
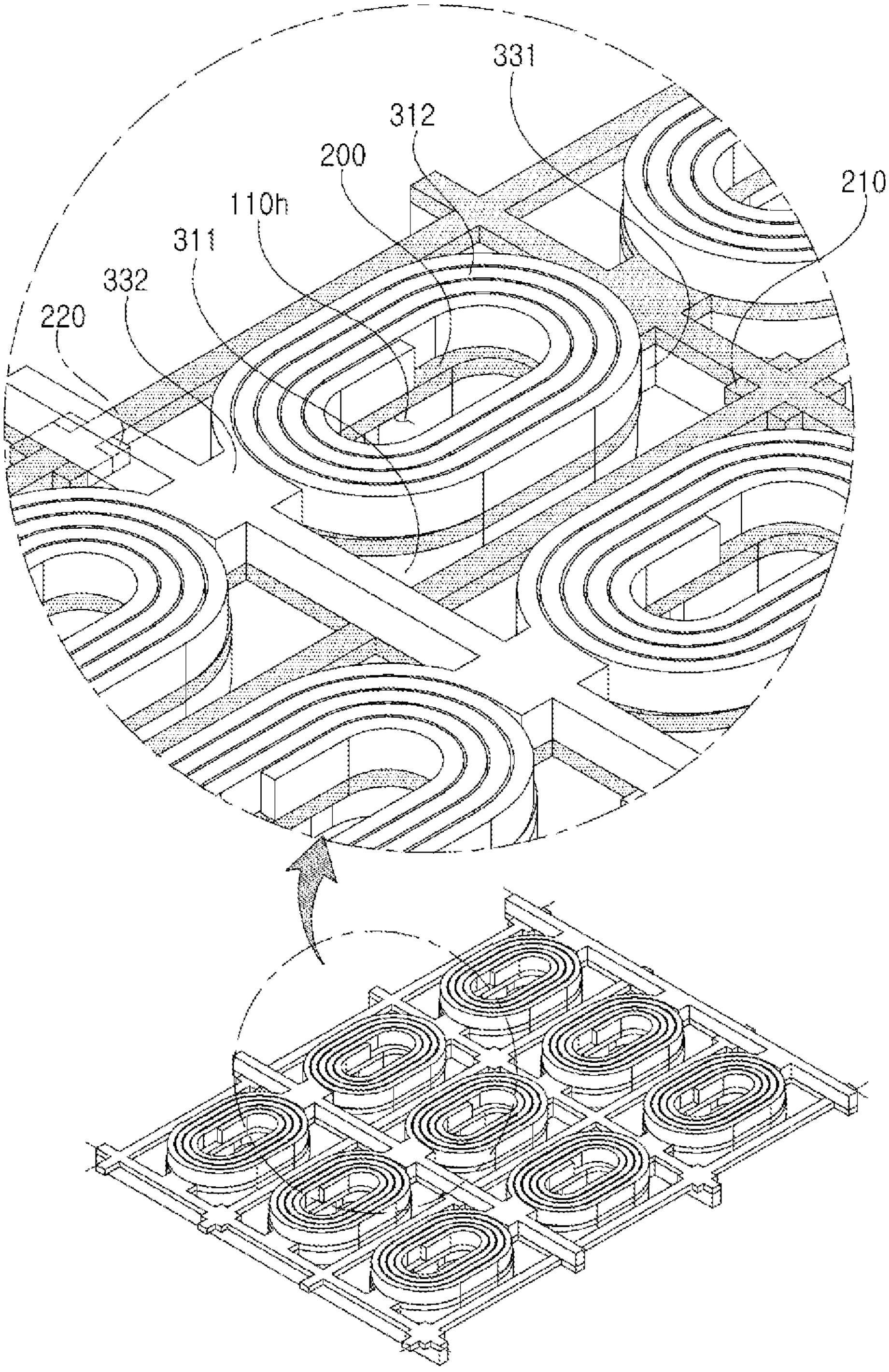
FIG. 12 is a view illustrating a step of forming a coil bar in a process of manufacturing the coil component according to the first exemplary embodiment in the present disclosure.
Figure 13:
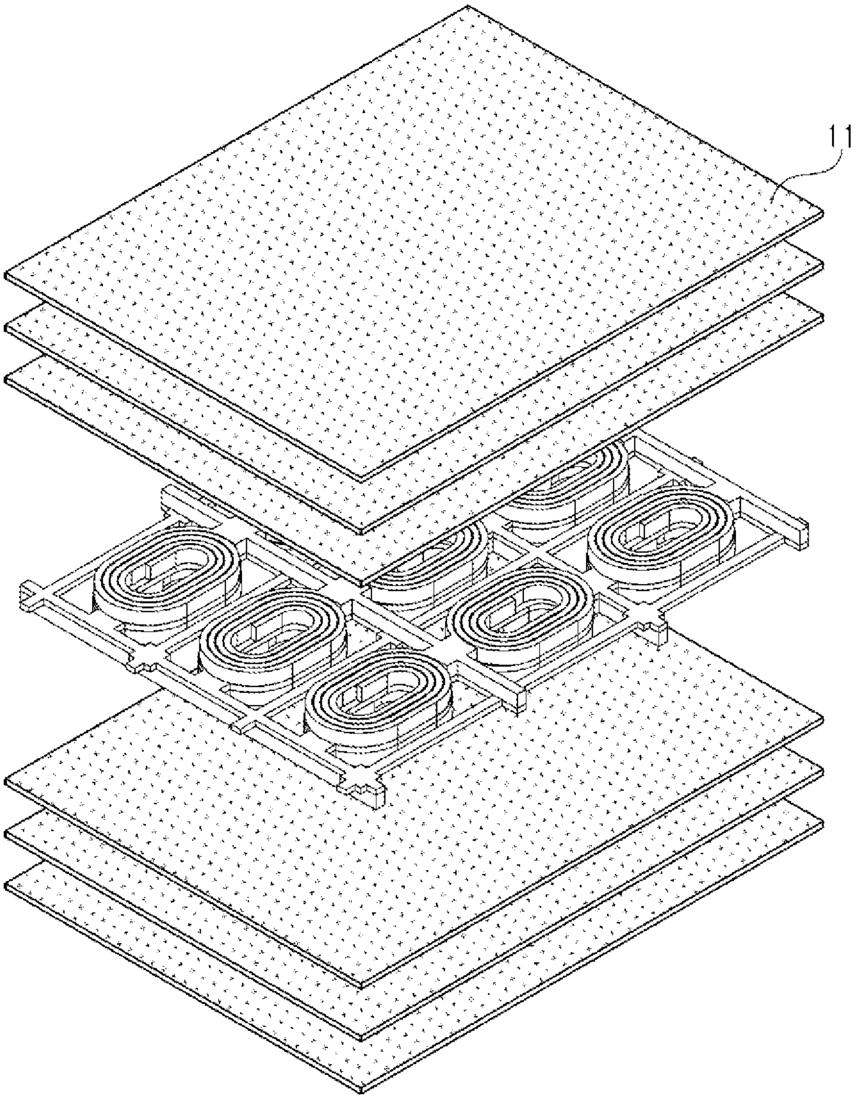
FIG. 13 is a view illustrating a step of forming a body on the coil bar of FIG. 12.
Figure 14:
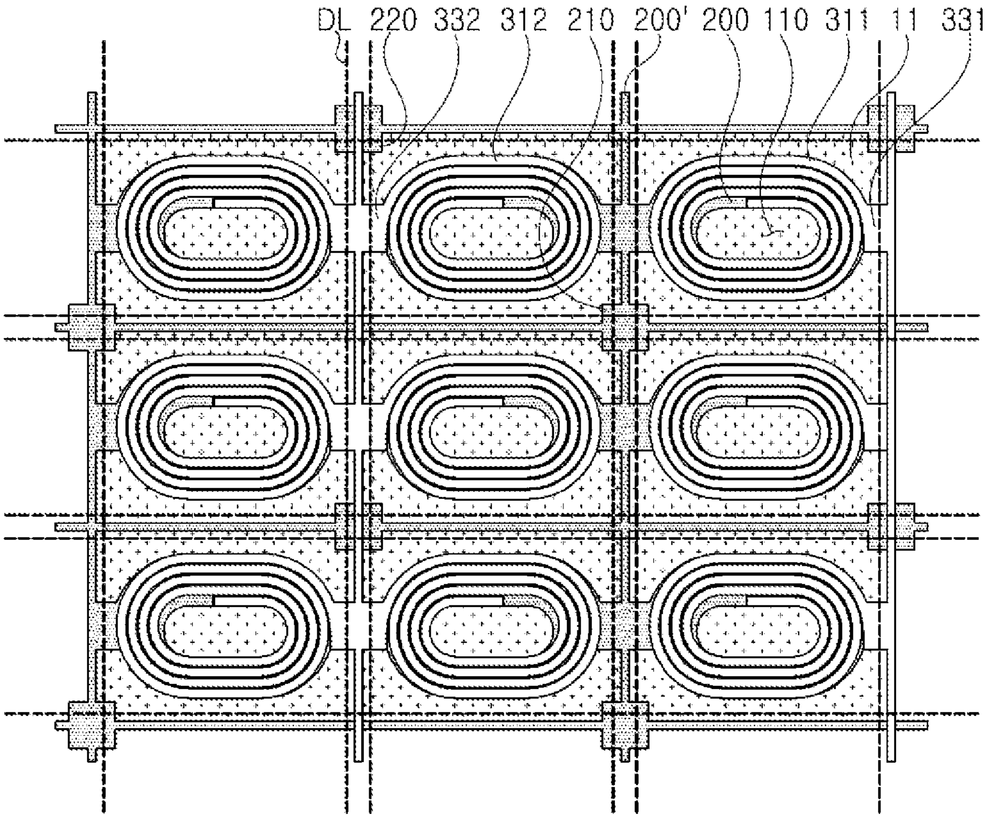
FIG. 14 is a view illustrating processing for dicing the body formed in FIG. 13 in chip units.

FIGS. 12 through 14 are schematic views illustrating some of a process of manufacturing the coil component 1000 according to the first exemplary embodiment in the present disclosure.

FIG. 12 is a view illustrating a step of forming a coil bar in the process of manufacturing the coil component 1000 according to the first exemplary embodiment in the present disclosure. FIG. 13 is a view illustrating a step of forming a body 100 on the coil bar of FIG. 12. FIG. 14 is a view illustrating processing for dicing the body 100 formed in FIG. 13 in chip units.

Referring to FIG. 12, a plurality of coil units 300 may be formed on the substrate 200.

The substrate 200 is not particularly limited, and may be formed of, for example, at least one of a copper clad laminate (CCL), prepreg (PPG), an Ajinomoto build-up film (ABF), and a photoimageable dielectric (PID). Also, the substrate 200 may have a thickness of 10 μm or more and 50 μm or less, but is not limited thereto.

An example of a method of forming the coil unit 300 may include an electroplating method, but is not limited thereto, and the coil unit 300 may include a metal having excellent electrical conductivity, e.g., silver (Ag), palladium (Pd), aluminum (Al), nickel (Ni), titanium (Ti), gold (Au), copper (Cu), platinum (Pt), or an alloy thereof.

The via 320 may be formed by filling a via hole, which is formed in a partial portion of the substrate 200, with a conductive material, and the coil patterns 311 and 312 formed on one surface and the other surface of the substrate 200 may be physically and electrically connected to each other through the via 320.

The coil unit 300 may include first and second lead-out portions 331 and 332 exposed to the first and second surfaces 101 and 102 of the body 100, respectively, after the dicing. In the coil bar state before the dicing, ends of two adjacent unit coil units 300 may be physically and electrically connected to each other.

A portion of the substrate 200 where the coil unit 300 is not formed may be removed. The removal of the substrate 200 may be performed by applying mechanical drilling, laser drilling, sand blasting, punching, or the like. For example, the substrate 200 may be removed using a $CO_2$ laser drill.

The through hole 110*h* penetrating through the substrate 200 may be formed by removing a central region of the substrate 200 where the coil unit 300 is not formed.

At this time, the insulating patterns 210 and 220 may be formed by removing the portion of the substrate 200 where the coil unit 300 is not formed, excluding partial regions thereof. Specifically, grid-type bridges 200' serving as plating lead-in lines may be formed across the entire substrate 200, and some of regions where the bridges 200' intersects may be formed in a tetragonal protrusion shape, such that these portions remain in the body 100 after dicing to function as insulating patterns 210 and 220.

The insulating patterns 210 and 220 may be formed in every intersecting region. However, even though only a pair of insulating patterns 210 and 220 opposing each other in the diagonal direction are formed for each coil component 1000, the insulating patterns 210 and 220 is observable from any of the four side surfaces of the body, functioning as intended by the present disclosure. Therefore, it may be preferable that one pair of insulating patterns 210 and 220 are formed at every two intersection points, while alternately disposing one pair of insulating patterns 210 and 220 at the bridges 200' between two adjacent rows, but the arrangement of the insulating patterns 210 and 220 is not limited thereto.

When only a pair of insulating patterns 210 and 220 opposing each other in the diagonal direction are arranged for each coil component 1000, a volume occupied by the insulating patterns 210 and 220 in the coil component 1000 may decrease as compared with that when the insulating patterns 210 and 220 are formed at all corners, resulting in an increase ineffective volume and an improvement in inductance characteristics.

The insulating film IF covering the coil unit 300 may be formed on the surface of the coil unit 300. The insulating film IF may be formed by methods such as a screen printing method, a spray application method, a vacuum dipping method, a vapor deposition method (CVD), or a film lamination method, but is not limited thereto.

Referring to FIG. 13, the body 100 may be formed by stacking the magnetic composite sheets 11 on the substrate 200 on which the coil unit 300 is formed.

The body 100 may be formed by stacking the magnetic composite sheets 11 on both surfaces of the substrate 200 and compressing the magnetic composite sheets 11 through a lamination method or a hydrostatic pressing method. Here, at least some of the magnetic composite sheets 11 may fill the through hole 110*h* formed in the central portion of the substrate 200, thereby forming the core 110.

Referring to FIG. 14, a pair of insulating patterns 210 and 220 opposing each other in the diagonal direction may be formed through dicing processing for individualizing a plurality of coil units 300 in the form of the coil bar.

Specifically, by dicing the body 100, which is made of the magnetic composite sheets 11, along dicing lines DL, the bridges 200' functioning as plating lead-in lines may be partially removed, and the insulating patterns 210 and 220 may remain. As a result, the individualized coil component 1000 may include insulating patterns 210 and 220 located at corners on the side surfaces of the body 100 and opposing each other in the diagonal direction.

The first insulating pattern 210 may be cut by a dicing tip and exposed to the first and third surfaces 101 and 103 of the body 100, and the second insulating pattern 220 may be cut by a dicing tip and exposed to the second and fourth surfaces 102 and 104 of the body 100.

Here, if a process error occurs in a dicing line DL and the coil unit 300 is misaligned with the center of the body, this misalignment can be confirmed from the outside of the body 100 based on shapes of the insulating patterns 210 and 220, locations of the insulating patterns 210 and 220, whether or not the insulating patterns 210 and 220 are observable, etc, As set forth above, according to an aspect of the present disclosure, it can be determined from the outside whether the coil unit is aligned with the center of the body of the coil component.

According to another aspect of the present disclosure, it is possible to sort, in advance, a coil component that is highly likely to have an exposure defect of a coil unit at a later time.

According to another aspect of the present disclosure, it is possible to reduce a short circuit defect and a leakage defect caused when the coil unit is exposed to the surface of the body.

While exemplary embodiments have been shown and described above, it will be apparent to those skilled in the art that modifications and variations could be made without departing from the scope of the present invention as defined by the appended claims.

What is claimed is:

1. A coil component comprising:

a body having a first surface and a second surface opposing each other in a first direction, and a plurality of side surfaces connecting the first surface and the second surface to each other;

a substrate disposed in the body;

at least one insulating pattern disposed on at least one corner where two of the plurality of side surfaces of the body are in contact with each other and exposed to the two side surfaces of the body;

a coil unit including a coil pattern disposed on at least one surface of the substrate with a plurality of turns, and lead-out portions respectively extending to opposing surfaces of the plurality of side surfaces of the body; and external electrodes disposed on the body and connected to the lead-out portions, respectively.

2. The coil component of claim 1, wherein the at least one insulating pattern includes first and second insulating patterns opposing each other in a diagonal direction passing a winding center of the coil pattern, based on a plane perpendicular to the first direction.

3. The coil component of claim 2, wherein the lead-out portions include a first lead-out portion extending to the same side surface of the body as the first insulating pattern, and a second lead-out portion extending to the same side surface of the body as the second insulating pattern, and a distance by which the first insulating pattern and the first lead-out portion are spaced apart from each other on a first side surface of the plurality of side surfaces of the body is substantially the same as a distance by which the second insulating pattern and the second lead-out portion are spaced apart from each other on a second side surface opposing the first side surface of the plurality of side surfaces of the body.

4. The coil component of claim 3, wherein the external electrodes include a first external electrode connected to the first lead-out portion, and a second external electrode connected to the second lead-out portion.

5. The coil component of claim 1, wherein the at least one insulating pattern is spaced apart from the substrate and located at substantially the same height as the substrate based on the first direction.

6. The coil component of claim 5, wherein the at least one insulating pattern includes the same ingredient as the substrate.

7. The coil component of claim 1, wherein on one of the plurality of side surfaces of the body to which each of the at least one insulating pattern and each of the lead-out portions are exposed, the at least one insulating pattern is spaced apart from a respective one of the lead-out portions by a predetermined distance.

8. The coil component of claim 7, wherein the at least one insulating pattern is spaced apart by a predetermined distance from a plane passing a winding center of the coil pattern in parallel to the opposing ones of the plurality of side surfaces of the body to which the lead-out portions respectively extend.

9. The coil component of claim 1, wherein the at least one insulating pattern is spaced apart by a predetermined distance from a plane passing a winding center of the coil pattern in parallel to the opposing surfaces of the plurality of side surfaces of the body to which the lead-out portions are respectively extends.

10. The coil component of claim 1, wherein the coil unit includes first and second coil patterns disposed on both surfaces of the substrate, respectively, and further includes a via penetrating through the substrate to connect inner end portions of the first and second coil patterns to each other.

11. The coil component of claim 1, further comprising an insulating layer disposed on the body, except for regions where the external electrodes are disposed.

12. A coil component comprising:

a body having first and second surfaces opposing each other, and third and fourth surfaces connecting the first and second surfaces to each other and opposing each other;

a substrate disposed in the body;

a first insulating pattern disposed on a corner on which the first and third surfaces of the body are in contact with each other;

a second insulating pattern disposed on a corner on which the second and fourth surfaces of the body are in contact with each other;

a coil unit including first and second coil patterns disposed on both surfaces of the substrate, respectively, with a plurality of turns, a via penetrating through the substrate to connect the first and second coil patterns to each other, and first and second lead-out portions extending to the first and second surfaces of the body, respectively; and first and second external electrodes disposed on the body and connected to the first and second lead-out portions, respectively.

13. The coil component of claim 12, wherein the body further includes fifth and sixth surfaces connected to the first to fourth surfaces of the body and opposing each other in a first direction, and the first and second insulating patterns are spaced apart from the substrate and located at substantially the same height as the substrate based on the first direction.

14. The coil component of claim 12, wherein a distance by which the first insulating pattern is spaced apart from the first lead-out portion on the first surface of the body is substantially the same as a distance by which the second insulating pattern is spaced apart from the second lead-out portion on the second surface of the body.

15. The coil component of claim 14, wherein the substrate has a through hole formed in a central portion thereof, and based on a plane perpendicular to each of the third and fifth surfaces of the body and passing a center of the through hole, a distance between the first insulating pattern and the plane is substantially the same as a distance between the second insulating pattern and the plane.

16. The coil component of claim 12, wherein the substrate has a through hole formed in a central portion thereof, and based on a plane perpendicular to each of the third and fifth surfaces of the body and passing a center of the through hole, a distance between the first insulating pattern and the plane is substantially the same as a distance between the second insulating pattern and the plane.

17. A coil component comprising:

a body having first and second surfaces opposing each other;

a substrate disposed in the body;

a coil unit including a coil pattern disposed on at least one surface of the substrate with a plurality of turns, and first and second lead-out portions extending to the first and second surfaces of the body, respectively;

a first insulating pattern disposed in the body, exposed to the first surface of the body, and spaced apart from the substrate;

a second insulating pattern disposed in the body, exposed to the second surface of the body, and spaced apart from the substrate; and first and second external electrodes disposed on the first and second surfaces of the body, respectively, and connected to the first and second lead-out portions, respectively.

18. The coil component of claim 17, wherein the body further includes third and fourth surfaces connecting the first and second surfaces to each other and opposing each other, and the first insulating pattern is further exposed to the third surface of the body, and the second insulating pattern is further exposed to the fourth surface of the body.

19. The coil component of claim 17, wherein a distance by which the first insulating pattern is spaced apart from the first lead-out portion on the first surface of the body is substantially the same as a distance by which the second insulating pattern is spaced apart from the second lead-out portion on the second surface of the body.

20. The coil component of claim 19, wherein a distance between the first insulating pattern and a plane passing a winding center of the coil pattern in parallel to the first and second surfaces of the body is substantially the same as a distance between the second insulating pattern and the plane.

* * * * *